United States Patent
Vallee et al.

(10) Patent No.: US 8,078,023 B2
(45) Date of Patent: Dec. 13, 2011

(54) SYSTEM AND METHOD FOR PERMANENTLY WRITING A DIFFRACTION GRATING IN A LOW PHONON ENERGY GLASS MEDIUM

(75) Inventors: Real Vallee, Quebec (CA); Martin Bernier, Quebec (CA); Dominic Faucher, Quebec (CA)

(73) Assignee: Universite Laval, Quebec (CA)

( * ) Notice: Subject to any disclaimer, the term of this patent is extended or adjusted under 35 U.S.C. 154(b) by 311 days.

(21) Appl. No.: 12/443,480

(22) PCT Filed: Sep. 28, 2007

(86) PCT No.: PCT/CA2007/001752
§ 371 (c)(1),
(2), (4) Date: Mar. 29, 2009

(87) PCT Pub. No.: WO2008/037089
PCT Pub. Date: Apr. 3, 2008

(65) Prior Publication Data
US 2009/0274420 A1    Nov. 5, 2009

Related U.S. Application Data

(60) Provisional application No. 60/847,687, filed on Sep. 28, 2006.

(51) Int. Cl.
G02B 6/34 (2006.01)
(52) U.S. Cl. .................................................. 385/37
(58) Field of Classification Search ............... None
See application file for complete search history.

(56) References Cited

U.S. PATENT DOCUMENTS

| | | | |
|---|---|---|---|
| 4,783,787 A | 11/1988 | Doi et al. | |
| 4,807,950 A | 2/1989 | Glenn et al. | |
| 5,367,588 A | 11/1994 | Hill et al. | |
| 5,400,422 A | 3/1995 | Askins et al. | |
| 5,822,479 A * | 10/1998 | Napier et al. | 385/37 |
| 5,912,999 A * | 6/1999 | Brennan, III et al. | 385/37 |
| 5,978,538 A | 11/1999 | Miura et al. | |
| 6,195,483 B1 | 2/2001 | Moon et al. | |
| 6,204,926 B1 | 3/2001 | Maznev et al. | |
| 6,297,894 B1 | 10/2001 | Miller et al. | |
| 6,347,171 B1 * | 2/2002 | Tatah et al. | 385/37 |
| 6,552,301 B2 | 4/2003 | Herman et al. | |
| 6,633,419 B2 | 10/2003 | Hosono et al. | |
| 6,636,665 B1 * | 10/2003 | Sceats et al. | 385/37 |
| 6,993,221 B2 | 1/2006 | Mihailov et al. | |
| 7,031,571 B2 | 4/2006 | Mihailov et al. | |

(Continued)

OTHER PUBLICATIONS

C. Meneghini et al. As2S3 photosensitivity by two-photon absorption: holographic gratings and self-written channel waveguides. J. Opt. Soc. Am. B, 15:12:2946-2950, Dec. 1998.*

(Continued)

*Primary Examiner* — Mike Stahl
(74) *Attorney, Agent, or Firm* — Baker & Hostetler LLP (57) ABSTRACT

A system and method for permanently writing diffraction gratings in low phonon energy glass waveguides are shown. Ultrashort light pulses are generated and made to form two beams synchronously superimposed in the waveguide, therefore forming an interference pattern corresponding to the desired grating. The light pulses are focussed so that the light intensity in the waveguide exceeds a filamentation threshold. The exposure of the waveguide to these light pulses is controlled temporally and spatially in order to limit detrimental thermal effects induced by the high-intensity pulses in the glass medium of the waveguide.

22 Claims, 6 Drawing Sheets

U.S. PATENT DOCUMENTS

| | | | |
|---|---|---|---|
| 2002/0126333 A1* | 9/2002 | Hosono et al. | 359/35 |
| 2003/0035623 A1* | 2/2003 | Wilcox et al. | 385/37 |
| 2005/0201682 A1 | 9/2005 | Hosono et al. | |
| 2006/0127024 A1* | 6/2006 | Smith et al. | 385/132 |

OTHER PUBLICATIONS

J. Lucas. Infrared glasses. Current Opinion in Solid State & Materials Science, 4:181-187, Apr. 1999.*

M. Zeller, T. Lasser, H.G. Limberger, and G. Maze "UV-Induced Index Changes in Undoped Fluoride Glass" Journal of Lightwave Technology, vol. 23, No. 2, Feb. 2005, pp. 624-627.

Glen M. Williams, Tsung-Ein, Tsai, Celia I. Merzbacher, and E. Joseph Friebele "Photosensitivity of Rare-Earth-Doped ZLAN Fluoride Glasses" Journal of Lightwave Technology, vol. 15, No. 8, Aug. 1997, pp. 1357-1362.

R. Sramek, F. Smektala, W.X. Xie, M. Douay, and P. Niay "Photoinduced surface expansion of fluorizirconate glasses" Journal of Non-Crystalline Solids 277, 2000, pp. 39-44.

K.M. Davis, K. Miura, N. Sugimoto, and K. Hirao "Writing waveguides in glass with a femtosecond laser" Optics Letters, vol. 21, No. 21, Nov. 1, 1996, pp. 1729-1731.

H. Hisakuni and K. Tanaka "Optical fabrication of microlenses in chalcogenide glasses" Optics Letters, vol. 20, No. 9, May 1, 1995, pp. 958-960.

T. Taunay, P. Niay, P. Bernage, and E. X. Xie "Ultraviolet-induced permanent Bragg gratings in cerium-doped ZBLAN glasses or optical fibers" Optics Letters, vol. 19, No. 17, Sep. 1, 1994, pp. 1269-1271.

Grobnic et al., "Bragg Gratings Written in Un-doped Fluoride Glass Fibres Using Ultrafast 800nm Radiation," Proceedings of European Conference on Optical Communications, ECOC 2006, Cannes, France, Sep. 24-28, 2006, art. No. 4801003 (Th3.3.7).

Mihailov et al., "Bragg Gratings Written in All-SiO2 and Ge-Doped Core Fibers With 800-nm Femtosecond Radiation and a Phase Mask," J. Lightwave Tech, vol. 22, No. I, pp. 94-100, 2004.

Grobnic et al., "Fiber Bragg Gratings With Suppressed Cladding Modes Made in SMF-28 With a Femtosecond IR Laser and a Phase Mask," IEEE Photon. Tech. Lett., vol. 16, No. 8, pp. 1864-1866, 2004.

Smelser et al., "Formation of Type I-IR and Type II-IR gratings with an ultrafast IR laser and a phase mask," Opt. Exp., vol. 13, No. 14, pp. 5377-5386, 2005.

Zoubir et al., "Femtosecond Fabrication of Waveguides and Gratings in Chalcogenide Thin Films," Conference on Lasers and Electro-Optics (CLEO 2002), Technical Digest Post Conference Edition, Long Beach CA, May 19-24, 2002.

* cited by examiner

SYSTEM AND METHOD FOR PERMANENTLY WRITING A DIFFRACTION GRATING IN A LOW PHONON ENERGY GLASS MEDIUM

BACKGROUND OF THE INVENTION

1. Field of the Invention

The present invention relates to methods of inducing a permanent refractive index pattern, or diffraction grating, in optical devices involving low phonon energy materials, through the use of interfering ultrashort and intense laser pulses.

2. Description of the Related Art

The traditional method of writing Bragg gratings in germanosilicate waveguides relies on the use of UV lasers and interferometry techniques that induce a periodic refractive index change in the waveguide. The spatial modulation of the refractive index change along the waveguide is generated using the two-beam interference technique as disclosed in U.S. Pat. No. 4,807,950 by Glenn et al. A more convenient method used to write Bragg gratings in germanosilicate waveguides relies on the phase-mask technique, as disclosed in U.S. Pat. No. 5,367,588 by Hill et al. In this case, a single UV light beam is used to generate the interference pattern through a diffractive element known as a phase mask. Unfortunately, this method was reported to induce a weak refractive index change in fluoride glass-based waveguides, as reported by Williams et al. in J. Lightwave Technol. 15, 1357 (1997).

Taunay et al. first reported a weak permanent refractive index change in $Ce^{3+}$—doped fluoride-based glass through UV exposure at 245 nm in Opt. Lett. 19, 1269 (1994). However, no significant refractive index change has been reported yet in undoped fluoride glasses using the same method. The use of the two-beam interference method was disclosed to write Bragg gratings in chalcogenide and chalcohalide-based infrared transmitting optical fibers as disclosed in U.S. Pat. No. 6,195,483 by Moon et al. In this prior art, an exposure time of about 3 minutes was necessary to saturate the refractive index change of chalcogenide-based fibers.

Another method of writing permanent Bragg gratings in waveguides is based on the use of interfering high intensity UV beams in order to locally damage the glass to create the refractive index change pattern as disclosed by Askins et al. in U.S. Pat. No. 5,400,422. The drawback of this method is that the refractive index change arises from periodic localized damages induced at the core-cladding interface of the fiber. The process is then closely dependent of the core and cladding glass compositions. The resulting gratings also present poor spectral quality since the refractive index change is only affecting a fraction of the propagating mode to be reflected. The 193 nm radiation was also used in the first attempt to produce refractive index changes in undoped fluoride glasses. Sramek et al. (J. Non-Cryst. Solids 277, 39 (2000)) observed that the fluorozirconate glasses photosensitivity was the result of a glass expansion under such 193 nm light exposure. Following on this work, Zeller et al. (J. Lightwave Technol. 23, 624 (2005)), reported refractive index changes of about $2\times10^{-4}$ in fluorozirco-aluminate (FZA) and about $2\times10^{-6}$ in fluoroaluminate (FA) and fluorozirconate (FZ). However, the refractive index change was strongly dependent on glass composition and did not appear to be applicable to the glass compositions that can be drawn into optical fibers. In fact, since it is related to a glass expansion instead of a glass compaction as in the case of silica glasses, the mechanism of refractive index change in fluoride glasses thus appears to rely on a different glass rearrangement. The same glass expansion was also observed in chalcogenide glasses under sub-bandgap illumination and was used to produce convex microlenses as reported by Hisakuni et al. in Opt. Lett. 20, 958, (1995).

A relatively new approach to photosensitivity based on the nonlinear absorption of high-intensity infrared radiation in the femtosecond pulse duration regime was reported by Davis et al. in Opt. Lett. 21, 1729, (1996) to induce wave guiding structures in glasses. Although the precise physical process responsible for the femtosecond pulse induced refractive index change is not fully understood and appears to depend on the glass itself, it apparently relies on the creation of localized plasma within the glass. In order to reach the appropriate plasma density, the writing beam must reach some critical intensity value, which is depending on various factors, including pulse duration and energy as well as focusing conditions. This promising approach to glass photosensitivity was disclosed by Miura et al. in U.S. Pat. No. 5,978,538 and was found to be useful to write waveguides in bulk silica and fluoride glasses. The fluoride glass composition used as an example in this patent is a fluorozirconate glass ($ZrF_4$—$BaF_2$—$LaF_3$—$AlF_3$—$NaF$), which is a common glass composition used in optical fiber fabrication. This approach was also used in relation to the creation of an interference femtosecond fringe pattern obtained with two spatially correlated beams by Maznev et al. in U.S. Pat. No. 6,204,926. This approach was further extended and disclosed by Miller et al. in U.S. Pat. No. 6,297,894 where the periodic refractive index change is now obtained based on the use of a diffractive element. An alternative version of Miller's technique was also disclosed by Mihailov et al. in U.S. Pat. No. 6,993,221, in which high-order mode Bragg grating structures were proposed. This method was further extended so as to allow for the suppression of cladding mode losses, as disclosed by Mihailov et al. in U.S. Pat. No. 7,031,571. These prior art methods offer useful functions but all suffer from a practical limitation. Indeed, although it is mentioned in these patents that the method could be successfully applied to any at least partially transmissive or absorbing material, the corresponding results and examples were restricted to silica glasses only. Since low phonon energy glasses have significantly different physical, and especially thermal, properties compared to silica-based glasses, it was demonstrated that the previous femtosecond approach could not be applied, as such, to low phonon energy glasses such as fluoride, chalcogenide and chalcohalide-based glasses without significant improvements in order to obtain strong and permanent refractive index changes.

There is therefore a need for a method and system to write permanent Bragg gratings or the like in fluoride glass which can provide a strong refractive index change and can be used in a variety of fluoride glass compositions.

SUMMARY OF THE INVENTION

In accordance with a first aspect of the present invention, there is provided a system for permanently writing a diffraction grating in a waveguide made of a low phonon energy glass medium.

This system includes light generating means for generating ultrashort light pulses, and an optical assembly for superposing two beams of these light pulses synchronously in the waveguide and forming therein an interference pattern corresponding to the diffraction grating. The optical assembly further focuses the light pulses so that a light intensity in the waveguide exceeds a filamentation threshold.

The system also includes controlling means for spatially and temporally controlling an exposure of the waveguide to the light pulses in order to limit grating erasing thermal effects induced in the glass medium by the light pulses.

In accordance with another aspect of the invention, there is also provided a system for permanently writing a diffraction grating in a waveguide made of a low phonon energy glass medium, which includes:

light source for generating a primary beam of ultrashort light pulses;

an optical assembly including:
- a phase mask positioned in a path of the primary light beam proximate the waveguide for superposing two beams of the light pulses synchronously in the waveguide and forming therein an interference pattern corresponding to the diffraction grating; and
- a focussing element disposed between the light source and the phase mask, the focussing element focussing the light pulses on the waveguide so that a light intensity in said waveguide exceeds a value such that a critical plasma density for permanent modification of said glass medium is reached, this value being of about 10 TW/cm$^2$ for ZBLAN; and controlling means for spatially and temporally controlling an exposure of the waveguide to the light pulses in order to limit grating erasing thermal effects induced in the glass medium by these light pulses, the said controlling means including:
- a scanning assembly for scanning one of the focussing element and waveguide with respect to the other and transversally to the path of the light pulses;
- a modulating element disposed in a path of the light pulses, the modulating element temporally modulating the light pulses to form at least one burst thereof;
- an interrupting mechanism for interrupting the exposure of the waveguide to the light pulses; and
- a monitoring assembly for monitoring optical properties of the waveguide, the monitoring assembly being in communication with the interrupting mechanism to activate the same according to the optical properties.

In accordance with yet another aspect of the invention, there is also provided a method for permanently writing a diffraction grating in a waveguide made of a low phonon energy glass medium. The method includes the following steps of:

a) generating ultrashort light pulses;
b) superposing two beams of these light pulses synchronously in the waveguide and forming therein an interference pattern corresponding to the diffraction grating;
c) focussing the light pulses so that a light intensity in the waveguide exceeds a filamentation threshold; and
d) spatially and temporally controlling an exposure of the waveguide to the light pulses in order to limit grating erasing thermal effects induced in the glass medium by the light pulses.

Other features and advantages of the present invention will be better understood upon reading of preferred embodiments thereof with reference to the appended drawings.

BRIEF DESCRIPTION OF THE DRAWINGS

For a better understanding of the invention and to show how the same may be carried into effect, reference is now made by way of example to the accompanying drawings in which.

DESCRIPTION OF PREFERRED EMBODIMENTS OF THE INVENTION

In accordance with preferred embodiments of the present invention, there are provided methods and systems for inducing a permanent refractive index pattern, or diffraction grating, in a waveguide made of a low phonon energy glass medium, such as the core of fluoride glass-based optical fibers, by the use of interfering ultrashort and intense laser pulses.

Throughout the present description, the expressions "Bragg grating" or "diffraction grating are understood to refer to any periodic or aperiodic refractive index pattern permanently induced in the target medium. It will be understood by one skilled in the art that the diffraction grating may be single or multi-channel, and may be chirped, slanted, sampled, or involve more than one such characteristics.

Preferably, the low phonon energy glass medium is a fluoride, chalcogenide or chalcohalide glass but can be any low phonon energy glass with similar physical properties. The sample can be an optical fiber but it could also be embodied by a planar waveguide or any other glass structure in which a Bragg grating can be useful. It is an advantageous aspect of the present invention that the low phonon energy glass medium can be of a variety of compositions, such as, but not limited to, doped or undoped fluoride glasses such as ZBLA, ZBLAN, ZBLALi, chalcogenide glasses such as As2S3 or As2Se3 or chalcohalide glasses.

Low phonon energy glasses typically have physical properties that significantly differ from those of fused silica, including but not limited to a much higher thermal expansion coefficient, a much lower glass transition temperature and a lower thermal conductivity. Their peculiar viscosity-temperature relationships also make them prone to react differently under plasma-induced conditions such as laser-induced filamentation. These characteristics lead to thermal effects that prevent the refractive index modulation from increasing regularly to a large value unlike what is seen in fused silica if special measures are not taken to control these detrimental effects. The present invention describes these measures and shows how they can be applied in order to induce a strong permanent refractive index modulation in a fluoride fiber.

Figure 1:
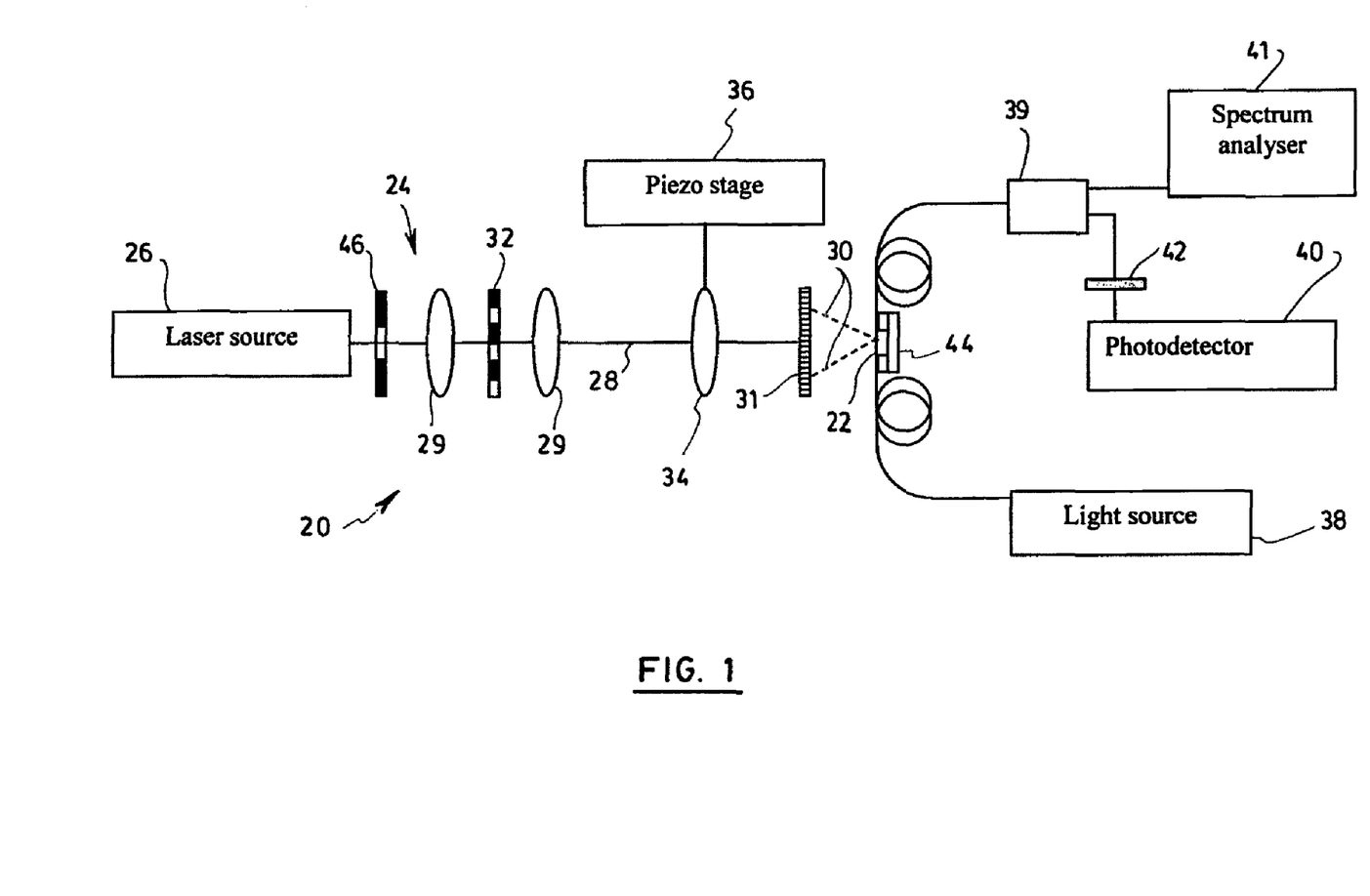
FIG. 1 schematically illustrates a system for writing Bragg gratings according to a preferred embodiment of the invention.

Referring to FIG. 1, there is shown a system 20 for writing a diffraction grating in a waveguide 22 of low phonon energy glass according to an embodiment of the present invention.

The system 20 first includes light generating means for generating ultrashort light pulses. An optical assembly 24 superposes two beams of these light pulses synchronously in the waveguide 22, in such a manner as to form an interference pattern in the waveguide which corresponds to the diffraction grating to be induced. The optical assembly 24 also focuses the light pulses so that the light intensity in the waveguide 22 exceeds a filamentation threshold, as will be explained further below.

The expression "ultrashort and intense laser pulses" can designate laser pulses with a duration of the order of about 500 fs or less and a sufficiently high intensity to induce a plasma in the glass medium through multiphoton absorption so that laser-induced filamentation can take place. For example, Bragg gratings were written in fluoride glass using the present invention with pulses of about 110 fs at the fiber. The angle between the interfering beams can be anywhere from 0 to 180 degrees.

Preferably the light generating means include a single light source 26 generating a primary beam 28, which is then divided by the optical assembly 24 into the two laser beams 30. The light source can for example be a solid-state laser, a fiber laser, a semiconductor laser, a dye laser, a gaseous laser, an amplification system, an optical parametric amplification system or a combination of one of these lasers and amplification systems. The optical assembly 24 may include a phase mask 31, to divide the primary beam 28 into the two interfering beams 30 and form the interference pattern, the waveguide 22 being carefully aligned parallel to the phase mask 31 in the interference zone of the ±1 diffraction orders. Alternatively, an interferometric assembly can be used for the same purpose. In another alternative, two different light sources could be used to generate coherent beams of light pulses, which could be superposed in the waveguide by an appropriate interferometric assembly.

As will be readily understood by one skilled in the art, the optical assembly may include any appropriate component for directing, focussing, amplifying or otherwise acting on the light beam or beams formed by the light pulses as may be required by the particularities of the system 20. In the illustrated embodiment, the primary beam 28 is for example magnified by a cylindrical telescope formed by two lenses 29. The optical assembly 24 further preferably includes a focusing element 34, here embodied by a cylindrical lens, disposed in the path of the primary beam 28, between the light source 26 and the phase mask 31, and focuses the light pulses on the waveguide 22.

In a preferred embodiment of the invention, the interference pattern formed by the superposed beams 30 has a period corresponding to the fundamental Bragg resonance of the desired reflector in the waveguide which is calculated using the Bragg relation as follows:

$$m\lambda_B = 2 \cdot \Lambda_{BG} \cdot n_{\mathit{eff}},$$

where m=1 corresponds to the fundamental Bragg resonance, $\lambda_B$ is the Bragg wavelength, $\Lambda_{BG}$ is the period of the Bragg grating and $n_{\mathit{eff}}$ is the effective refractive index of the propagating mode in the waveguide at the Bragg wavelength. In cases where the interference pattern is generated using an appropriate interferometric optical assembly, the interference angle θ between the two superimposed beams is calculated as follows:

$$\theta = 2 \cdot \arcsin\left(\frac{\lambda_I}{2 \cdot \Lambda_{BG}}\right),$$

where $\lambda_I$ corresponds to the wavelength of the laser used to produce the interference pattern. With the use of a diffractive element known as a phase mask, the interference of the ±1 diffraction orders is generally used to generate the interference pattern. The phase-mask period is calculated in order to obtain a fundamental Bragg resonance in the waveguide as follows:

$$\Lambda_{PM} = \frac{m \cdot \lambda_B}{n_{\mathit{eff}}},$$

where m=1 corresponds to the fundamental Bragg resonance in the waveguide.

The interfering laser beams are focused on the glass medium and the delay between the two beams is adjusted so that the pulses thereof are synchronized at the glass medium. One can note that by using a phase-mask, the pulses are automatically synchronized provided the phase-mask and the waveguide are disposed parallel to each other. The intensity of the interfering two coherent laser beams at the glass medium is set slightly above a filamentation threshold of the order of 10 TW/cm$^2$ whereat mechanisms inducing a permanent change of the refractive index in the glass medium take place.

When a high-intensity laser beam is focused in a transparent material at intensities higher than some threshold value, a filament is created resulting from the balance between focusing effect resulting from Kerr nonlinearity and the counteracting plasma defocusing effect. Under such conditions, the plasma is reaching a density such that permanent glass modifications occur. This filamentation process shows the additional benefit of being self-controlled therefore resulting in a clamping of the peak intensity of the beam propagating in the glass, as demonstrated by Becker et al. in Appl. Phys. B, 73, 287 (2001). Such intensity clamping is providing a convenient writing window, in terms of pulse energy, where refractive index changes with minimum losses can be produced, i.e. without damaging the glass. The optimum conditions for the onset of the filamentation process depend on the pulse parameters, the focusing conditions as well as the material itself. However, it is more likely to occur under relatively loose focusing conditions, i.e. typically for focal lengths longer than 30-40 mm. It is also accompanied—and can be identified as such—by the onset of a broadband light (or supercontinuum) emitted along the propagation axis of the writing laser beam.

As for the physical process leading to glass modification, it should be understood that it is a localised effect of spatial extent which must be less than half the grating period. As such, it should not be confused with the refractive index change arising from the thermal effect associated with laser pulse trains of higher repetition rates, said in the hundreds of kHz regime or higher, which are useful for optical waveguide writing.

In the prior art, it was found that the intensity of the interfering laser pulses should be limited below the threshold of supercontinuum generation that has been correlated with nonlinear self-focusing processes, in order to avoid damages. The present invention overcomes this aforementioned limitation by supporting the following examples where supercontinuum generation was observed without measurable damages with sufficiently long time exposures necessary to obtain low loss and high reflectivity Bragg gratings. In fact, the transmission losses associated with these damages occurring in the glass medium were measured for Bragg gratings described in examples 1 and 2 and were found to be smaller than about 0.3 dB. Such low transmission losses are not a limitation in applications such as fiber lasers where intracavity losses are a critical issue.

Figure 2A:
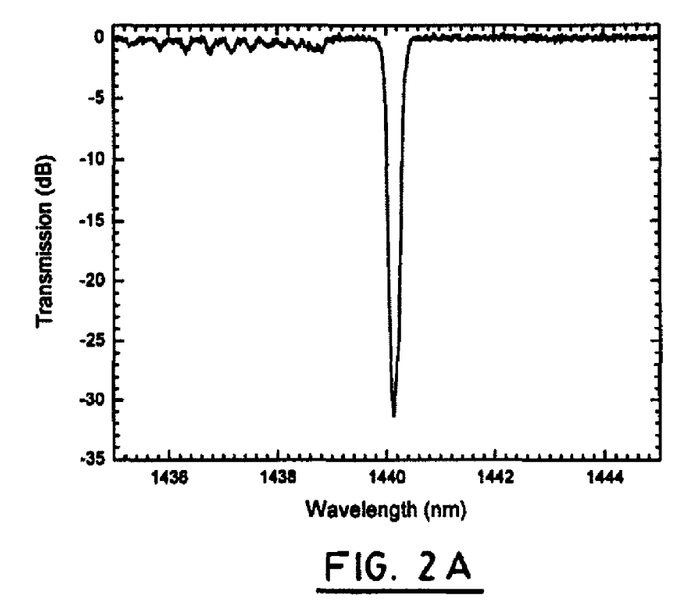
FIG. 2A is a graph showing the transmission spectrum of 99.9% reflective fiber Bragg gratings written in a single-mode undoped ZBLAN fiber after an exposure time of 4 seconds.
Figure 2B:
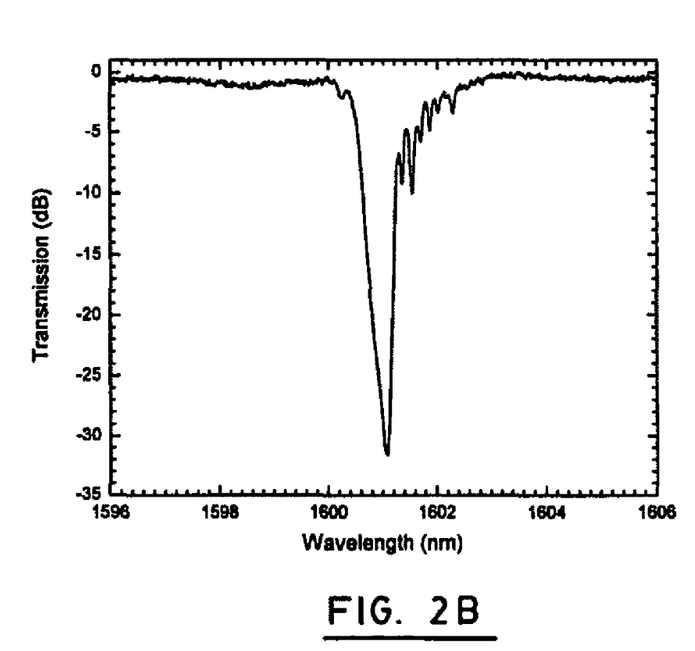
FIG. 2B (PRIOR ART) is a graph showing the transmission spectrum of 99.9% reflective fiber Bragg gratings written in a standard single mode silica hydrogen-free SMF28 fiber after an exposure time of 35 seconds.

In accordance with a preferred embodiment of the invention, it has been found advantageous to use the fundamental Bragg resonance in optical devices involving low phonon energy glasses in order to obtain a high reflectivity grating with minimal propagation losses in the waveguide caused by the writing process. These propagation losses result from the interaction of the high energy pulses with the low phonon energy material. The interfering high-intensity pulses in low phonon energy glass lead to a thermal expansion of the glass as detailed in the related art. This glass expansion prevents the refractive index change to be localised in the induced periodic structure leading to a sinusoidal-like shaped grating. The grating reflectivity of a periodic structure having an order n is closely related to the value of the $n^{th}$ Fourier coefficient representing the periodic structure as explained by Hongzhi et al. in Opt. Comm. 178, 339, (2000). It was reported in this paper that in order to obtain the same reflectivity of about 50% between the first and second diffraction orders of a saturated sinusoidal Bragg grating, a fluence of 50 times greater is necessary for the second order compared to the one necessary for the first order. In silica waveguides, the refractive index change was found to be localised in the induced periodic structure, leading to a highly non-sinusoidal shaped grating. This results from the intensity-dependant multiphoton absorption in the glass and ensures a high reflectivity at high-order Bragg resonances. However, the reflectivity of high-order Bragg gratings in low-phonon energy glasses remains low even with a large refractive index modulation due to the harmonicity of the resulting structure. In this case, in order to obtain the same reflectivity from a fundamental and a high-order Bragg resonance, the exposure time will be considerably longer in the high-order case and the maximum reflectivity will remain low. However, our experiments demonstrated that propagating losses at least as high as 0.5 dB are generated in the waveguide if the exposure time is greater than about 30 s. Thus, in low phonon energy glasses, it is preferable that the grating is of fundamental order instead of a high order. Gratings with reflectivities greater than 99.9% were obtained in both fluoride-based and silica-based fibers by using the fundamental Bragg resonance as shown in FIGS. 2A and 2B.

The use of high intensity pulses and of a fundamental Bragg resonance in low phonon energy materials is important in order to obtain a highly reflective Bragg grating after a short exposure time. However, the interaction of high-intensity pulses with the low phonon energy glasses also lead to thermal effects that prevent the refractive index modulation from increasing regularly to a large value unlike what is seen in fused silica if special measures are not taken to control these detrimental effects. Accordingly, the present invention involves controlling means for spatially and temporally controlling the exposure of the waveguide to these light pulses, in order to limit grating erasing thermal effects induced in the glass medium.

Figure 3:
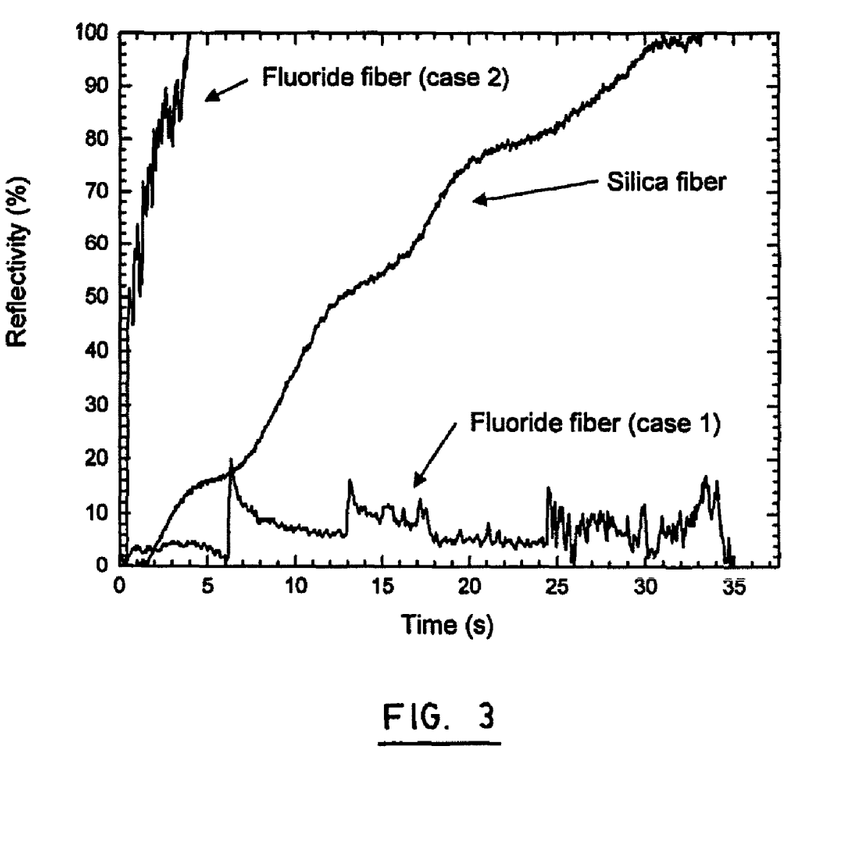
FIG. 3 is a graph showing the evolution of the peak reflectivity as a function of the exposure time for a Bragg grating written in a standard (SMF28) silica fiber compared with ones written in undoped single-mode ZBLAN fibers with (case 2) and without (case 1) the application of the control of detrimental thermal effects.

Contrary to what is observed in fused silica waveguides, the grating formation process in low phonon energy glass has been shown to occur much faster and in an irregular fashion. In fact, the grating can even be suddenly erased completely on a timescale of about 0.5 to perhaps a few seconds. This behaviour is attributed to detrimental thermal effects occurring inside the low phonon energy glass which has significantly different physical properties than fused silica including mainly a low glass transition temperature, a low thermal conductivity, a high thermal expansion coefficient and a steep viscosity-temperature relationship. A set of measures have to be taken to limit the impact of these detrimental thermal effects and allow a strong grating to be written. The importance of these measures can be clearly observed at FIG. 3. The setup detailed in example 1 was used to write Bragg gratings in both single-mode fluoride-based and silica-based fibers. FIG. 3 shows the evolution of the reflectivity of such Bragg gratings as a function of the exposure time. For the silica fiber, the control of detrimental effects described below was not applied but the reflectivity of the resulting Bragg grating increased regularly to reach a maximum reflectivity of about 99.9% after an exposure time of about 30 seconds. The same experiment was done in a fluoride-based fiber and the resulting reflectivity is shown at FIG. 3 (case 1) in which case the reflectivity was found to grow in an irregular fashion and reach no more than 20% after an exposure time of 35 seconds. When the control of detrimental effects is applied, the Bragg grating written in a fluoride-based fiber, which is shown at FIG. 3 in case 2, is growing rapidly, reaching a reflectivity of 99.9% after an exposure time of about 4 seconds. This demonstration clearly shows the importance of controlling such detrimental effects in order to obtain a high reflectivity Bragg grating after a short exposure time.

Different manners of controlling detrimental thermal effects by controlling the exposure of the waveguide to the light pulses both spatially and temporally have been identified and are explained hereinbelow. It will be understood by one skilled in the art that some of these features can be used alternatively or in combination, depending on the parameter of a particular application of the present invention.

The pulse energy and duration and the repetition rate of the pulse train in particular have to be chosen carefully so that the intensity threshold for writing is reached without heating the waveguide too much. Referring again to FIG. 1, the controlling means preferably include a modulating element 32 disposed in the path of the light pulses. The modulating element 32 may be used to temporally modulate the primary beam or both interfering beams into bursts of light pulses. In example 1 detailed below, the pulse duration and energy were controlled directly from the laser while the duty cycle was controlled by the modulating element 32 which can be embodied by a mechanical chopper, an acousto optic modulator or any other equivalent approach.

It was found that the exposed region around the waveguide has to be controlled very precisely. In fact, it was observed that the transverse beam self-compression produces a narrow channel of refractive index change. This narrow channel or so-called filament which is of the order of 1 micron in width is significantly smaller than the typical size of an optical fiber core for instance. To compensate for this effect and to evenly distribute the refractive index change across the waveguide, the focusing lens 34 is preferably mounted on a piezoelectric stage 36 so as to scan the beam along the waveguide 22. It was observed in some cases that even a slight departure of the amplitude or frequency of the scanning away from the optimum writing conditions would prevent the formation of the grating or even erase it. Thus, these parameters can be important to the writing process. It will be noted that although the method described here is based on scanning the lens, any other equivalent method would be effective, such as moving the waveguide relative to the laser beam, and that the controlling means of system of the present invention may therefore include any scanning assembly apt to scan one of the focussing element or the waveguide with respect to the other end transversally to the light pulses.

Since the grating formation occurs very rapidly, it can be advantageous to use a fast computer-controlled setup that stops the exposure as soon as the desired grating is formed. The controlling means of the system 20 of FIG. 1 therefore includes an interrupting mechanism for interrupting the exposure of the waveguide to the light pulses, and a monitoring assembly in communication with this mechanism to monitor the optical properties of the waveguide and activate the interrupting mechanism when these properties indicate that the grating is formed. In the system of FIG. 1, the monitoring assembly includes a broadband light source 38 and a fast photodetector 40 that measures the transmitted light so as to monitor the grating strength in real-time. A narrow bandpass filter 42 is used to remove out-of-band light, allowing the photodetector 40 to provide an accurate value of the grating strength. The photodetector signal is sent to a computer (not shown) that closes an electro-mechanical shutter 46 whenever the desired grating strength is obtained. In this embodiment, the shutter 46 therefore serves as the interrupting mechanism. In the advent that thermal effects that could not be controlled efficiently partially erase the grating after the shutter is closed, the setup preferably operates in a feed-back loop that keeps reopening the shutter 46 until the desired grating strength is reached. It is understood that any similar setup with the same purpose can also be used without leaving the scope of the present invention.

Due to a high coefficient of thermal expansion, it was found that, in cases where the waveguide is an optical fiber, this fiber can move during the writing process, if not held tight enough. To prevent this, a fiber holder 44 can be provided to hold the fiber on both sides of the beam focus, the fiber holder 44 allowing a tension to be applied to the fiber. Alternatively, the fiber can be fixed in place with some special fixture. The exposed region of the fiber is surrounded by air to allow it to cool efficiently. The tension has to be sufficiently high so as to keep the fiber straight and static with respect to the laser beam as thermal expansion of the glass stretches it. On the other hand, too high a tension will rupture the fiber when it is heated by the laser beam. Any other alternative scheme to compensate for the glass thermal expansion could have been used.

In accordance with another aspect of the present invention, there is also provided a method for permanently writing a diffraction grating in a waveguide made of a low phonon energy glass medium. This method includes the steps below. It will be understood that these steps are not meant to be performed in a successive order and that any performance of the listed action in any logical order is understood to be within the scope of the present invention.

The method first includes a step a) of generating ultrashort light pulses, and a step b) of superposing two beams of these light pulses synchronously in the waveguide, forming therein an interference pattern corresponding to the desired diffraction grating. These steps are preferably accomplished by generating a primary beam of light pulses, and providing a phase mask in the path of the primary light beam proximate the waveguide. The phase mask preferably has a pitch selected to favour a fundamental Bragg resonance of said diffraction grating The method further includes a step c) of focussing the light pulses so that a light intensity in the waveguide exceeds a filamentation threshold, as explained above. A focussing element may be provided between the light source and the phase mask for this purpose, the focussing element focussing the light pulses on the waveguide.

The method also includes a step d) of spatially and temporally controlling an exposure of the waveguide to the light pulses in order to limit grating erasing thermal effects induced in the glass medium by these light pulses. This controlling may be achieved through one or several of the following substeps.

The controlling of step d) may first include scanning one of the focussing element and waveguide with respect to the other and transversally to the path of the light pulses. The controlling of step d) may further involve temporally modulating the light pulses to form at least one burst. It may also involve monitoring optical properties of the waveguide, and interrupting the exposure of the waveguide to the light pulses according to these optical properties. The controlling of step d) may also include holding the waveguide in a fixed position and optionally apply a tension thereon.

EXAMPLE

Examples of diffraction gratings produced using the method above and the exemplary system of FIG. 1 are shown below and in the accompanying drawings.

In the setup used for these examples, the femtosecond laser source 26 was a Ti-sapphire regenerative amplifier system (Spectra-Physics) emitting fs pulses at a wavelength of 800 nm and a repetition rate of 1 kHz. Fourier-transform limited pulses of 45 fs were produced at the laser output but were broadened to 115 fs when reaching the fiber. In this embodiment, pulse energy of 1.2 mJ was used at the output of the amplifier system. A computer-controlled electro-mechanical shutter 46 was used to control the exposure time. A cylindrical telescope formed by two lenses 29 was used to provide a magnified beam of ~5 mm×7.5 mm (diameter at 1/e in intensity). To avoid heating effects that hinder the grating formation process, a 50% duty cycle mechanical chopper 32 was used at 950 Hz to decrease the average optical power of the beam, providing a burst of pulses. A cylindrical lens 34 of a focal length of 112 mm was used to focus the beam on the fiber core 23 through a first-order silica phase mask 31. Assuming Gaussian beam optics, the width of the focal line at the fiber was $2w \sim 12$ μm. The size of the elongated focal spot was therefore 12 μm×7500 μm. A piezo translation stage 36 having a resolution of 0.1 nm was used to scan the cylindrical lens 34 over a 10 μm range at a constant velocity with a frequency of 8 Hz. Still in this preferred embodiment, both an undoped and a 2000 ppm thulium-doped ZBLAN fibers provided by Le Verre Fluoré with cladding diameters of 125 μm were used, core diameters of 6.8 μm and 5.0 μm respectively and numerical apertures of 0.16 and 0.12 respectively, although any similar fiber can be used. The polymer jacket of the fiber was removed prior to the exposition and the fiber was aligned precisely parallel to the beam focus. The fiber was held at two points on either side of the beam focus with a fiber holder 44 that allows a tension to be applied to the fiber. The tension applied to the fiber during the writing process was about 12 MPa. Two different phase masks 31 on UV-grade fused silica substrates were used with uniform pitches of 1070 nm and 992 nm, with corresponding fundamental Bragg resonance at wavelength of about 1.6 μm and 1.48 μm respectively. Since the phase mask pitches were close to the writing wavelength ($\lambda \sim 0.8$ μm), the zero order could not be suppressed and transmitted ~25% of the incident power, leaving diffraction efficiencies of 35% for each of the ±1 orders. The fiber was positioned 320 μm away from the mask, sufficiently far from the beam focus so as to avoid damages in the phase mask and any detrimental effects arising from the interference with the zero-order beam. The monitoring setup consists of a supercontinuum-based broadband light source 38 and a splitter device 39 that divides the transmitted light between an optical spectrum analyser 41 and a fast photodetector 40 to monitor the grating formation in real time. A narrow bandpass filter 42 was used to remove all out-of-band light so that the photodetector 40 could provide an accurate value of the grating strength. The photodetector signal was sent to a computer that closed the electro-mechanical shutter 46 whenever the desired grating strength was obtained.

Example 1

The setup described above was used to inscribe Bragg gratings in an undoped single-mode ZBLAN fiber and, for the sake of comparison, in a hydrogen-free standard single-mode silica fiber (SMF28). The transmission spectra of the Bragg gratings written according to the preferred embodiment of the method described is shown in FIG. 2B for the silica fiber and FIG. 2A for the fluoride fiber. For the silica fiber, the control of the detrimental thermal effects previously described was not applied but the reflectivity of the resulting Bragg grating is shown to grow regularly to reach a maximum reflectivity of about 99.9% after an exposure time of about 30 seconds, as shown in FIG. 3 (Silica fiber). The same experiment was done in the undoped fluoride-based fiber and the resulting temporal evolution of the peak reflectivity is shown at FIG. 3 (case 1) in which situation the peak reflectivity was found to grow in an irregular fashion and reached no more than 20% after an exposure time of 35 seconds. When the control of detrimental effects is applied according to the preferred embodiment of the method and system described, the peak reflectivity of the Bragg grating written in the undoped fluoride-based fiber, which is presented in FIG. 3 (case 2), is growing rapidly, reaching about 99.9% after an exposure time of about 4 seconds.

Example 2

Figure 4A:
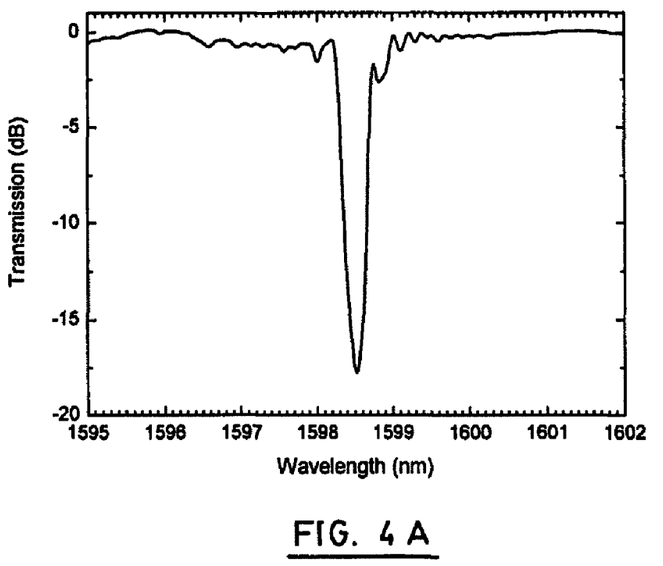
FIGS. 4A and 4B are graphs respectively showing the transmission spectrum of a fiber Bragg grating written in a single-mode undoped ZBLAN fiber after an exposure time of 2 seconds and a fiber Bragg grating written in a 2000 ppm thulium-doped ZBLAN fiber after an exposure time of 3 seconds.
Figure 4B:
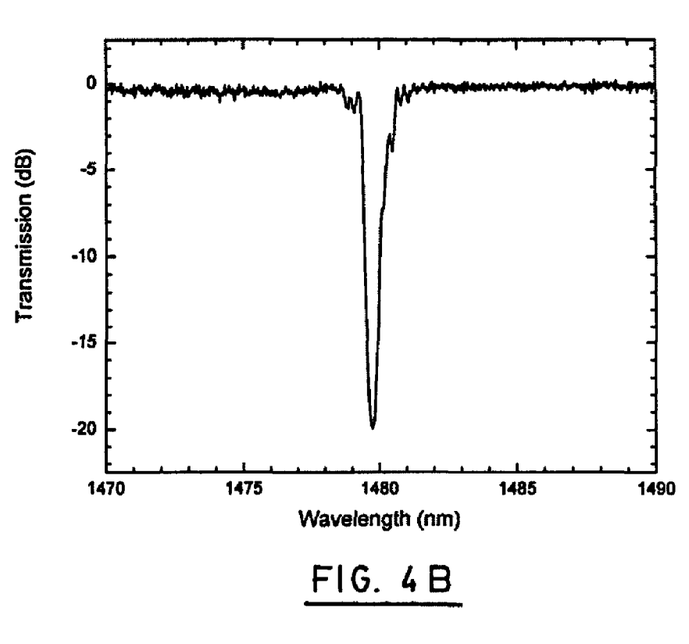

The setup described above was also used to inscribe Bragg gratings in both an undoped single-mode ZBLAN fiber and in a 2000 ppm thulium-doped single-mode ZBLAN fiber. The exposure time of the undoped fiber was set to about 2 seconds and the uniform phase-mask pitch was 1070 nm. The transmission spectrum of the resulting Bragg grating according to the preferred embodiment of the method described is shown in FIG. 4A. A numerical simulation of the corresponding grating parameters indicates that the transmission dip of −17 dB at 1598.5 nm corresponds to a 4.5 mm long uniform grating of 95% reflectivity with an index modulation $\Delta n_{AC}$ of 3.2×10−4. Out-of-band insertion losses were measured by a cutback method to be smaller than 0.3 dB. The exposure time of the thulium-doped fiber was set to about 3 seconds and the uniform phase-mask pitch was 992 nm. The transmission spectrum of the resulting Bragg grating according to the preferred embodiment of the method described is shown in FIG. 4B. The transmission dip of −20 dB at 1479.3 nm corresponds to a grating peak reflectivity of 99%. Thereby, the presence of active ions in the fiber core does not appear to interfere significantly with the photosensitivity process.

Figure 5:
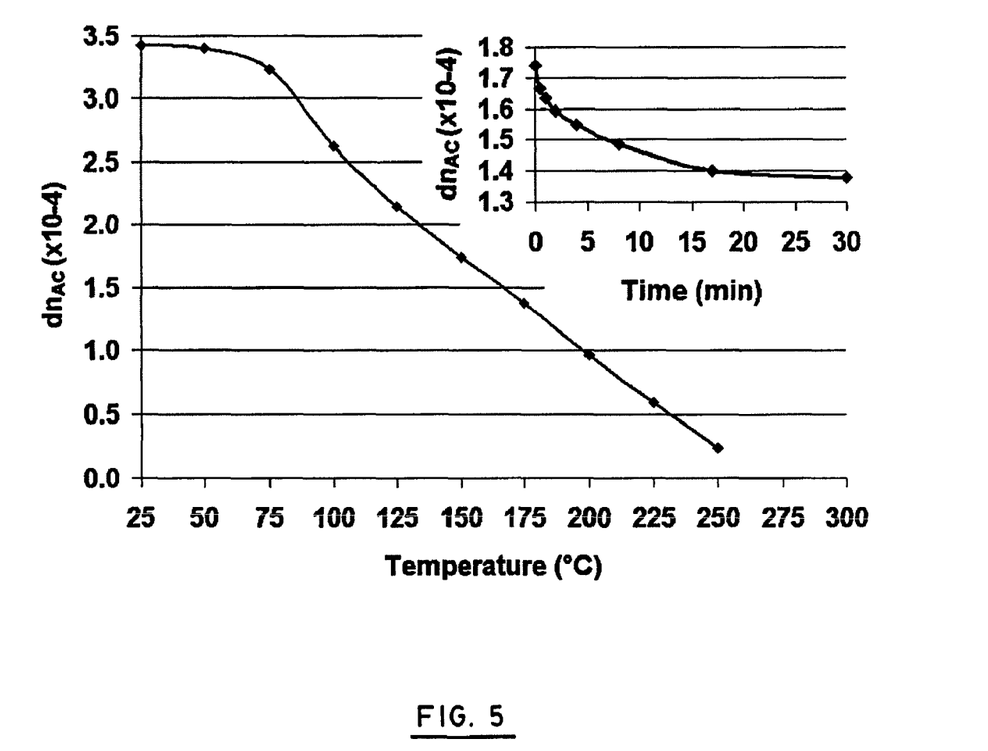
FIG. 5 is a graph showing the evolution of the reflectivity of a fiber Bragg grating written in an undoped single-mode ZBLAN fiber during a thermal annealing.

The thermal stability of the gratings in fluoride fibers is an important issue from a practical perspective. A micro-oven (ASP-500C) was used to anneal the grating and measure the variation of the index modulation with temperature. The annealing behavior of a similar grating as the one above written in the same fiber during about 3 seconds is shown in FIG. 5 where each point represents the $\Delta n_{(AC)}$ after a 30 min annealing at a constant temperature. One notes that the gratings are partially erased at low temperature. Similar gratings written in silica fibers are comparatively less prone to erasing at room temperature. The principal cause of this behavior is the low glass transition temperature of ZBLAN (Tg~250° C.) as compared to the one of fused silica (Tg~1000° C.). As shown in FIG. 5, the induced index modulation is reduced by about 50% at 125° C. The inset in the figure also shows that the index modulation decreases exponentially versus annealing time to reach an asymptotic value after ~30 min at a constant temperature of 175° C.

Figure 6:
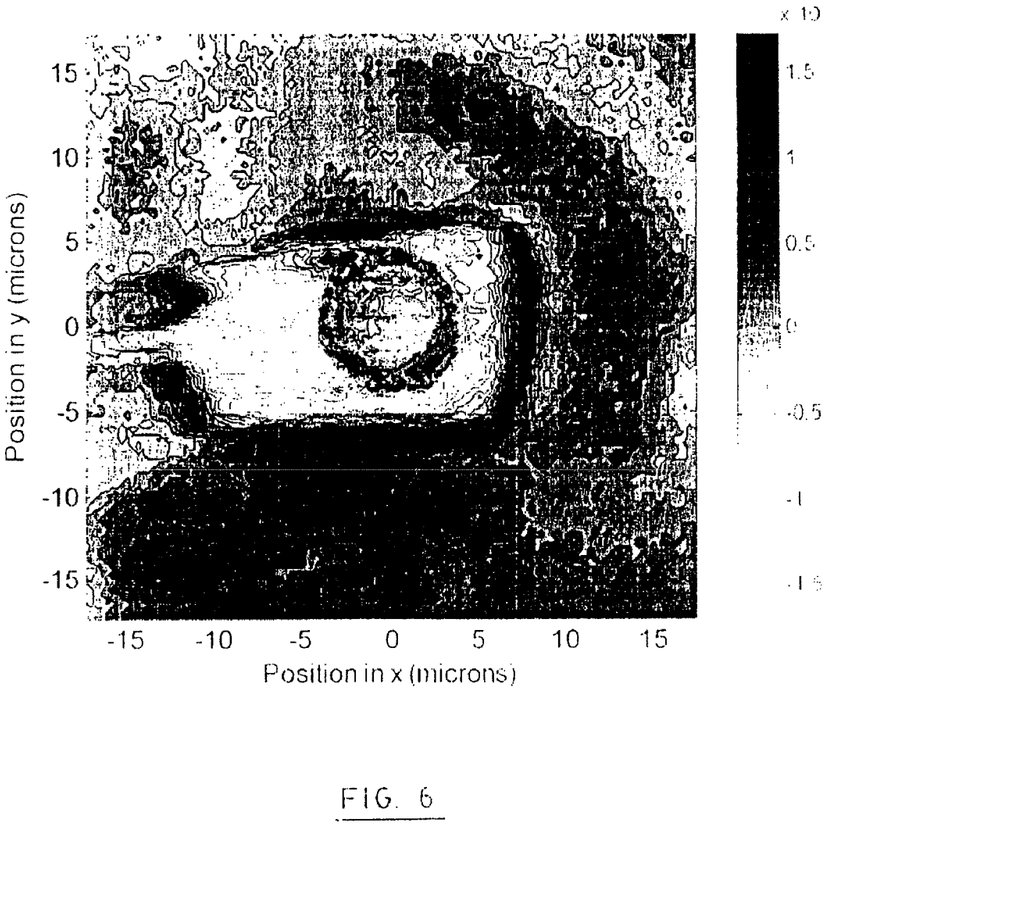
FIG. 6 shows a contour plot of the refractive index change induced across the cross-section of an undoped ZBLAN fiber.

In order to determine if the refractive index change is positive or negative, the fiber was cleaved at the center of another similarly written grating and the refractive index profile was measured at 657 nm by the refracted-near-field (RNF) technique. We used a NR-9200HR optical fiber analyzer from EXFO with a spatial resolution of 0.4 μm and a refractive index resolution of 5×10−5. The grating's transverse refractive index profile thus measured is then subtracted from the profile measured for an unexposed fiber segment. The resulting refractive index change profile is shown in FIG. 6 (Note: the refracted near-field apparatus provides dc refractive index variations averaged over a depth of ~500 μm). It appears that the induced refractive index variation actually consists of a roughly rectangular area of 16×10 μm extending in both the cladding and the core regions with an average $\Delta n_{(DC)}$ of −9.5×10−4. The effect of scanning the beam transversally over the fiber cross-section section is readily apparent in that the height of the box corresponds to the 10 μm scanning range of the beam focus. This measurement actually shows that the induced index change is essentially negative in the exposed area and positive along the rectangle perimeter corresponding to the light exposure border. As for the ring of positive index change lying along the core-cladding interface, we believe it is a mathematical artifact arising from the abrupt variation in that region, although it might also originate from a slight expansion of the core glass material or the diffusion of some of the glass constituents following exposure. These measurements are consistent with the glass dilation in fluorozirconate glasses reported by Sramek et al. in J. Non-Cryst. Solids 277, 39 (2000) leading to negative index changes.

As will be appreciated by one skilled in the art, the present invention provides an efficient and simple method to write Bragg gratings in low phonon energy glass optical waveguides that can be used in many applications. Of particular importance is the substitution of bulk cavity mirrors by fiber Bragg gratings in upconversion fiber lasers, providing more efficient and rugged laser devices at the desired wavelength with a fine linewidth. Perhaps more importantly, it allows the fabrication of fiber lasers operating at wavelengths higher than 2 μm where fused silica is not transparent. It also allows the design of various all-fluoride fiber components and systems that can be used in applications such as fiber sensors, infrared spectroscopy, laser ablation and biomedical treatment of tissues. Since the refractive index change appears to be negative at least in the demonstration of the method detailed here, interesting applications in dispersion compensation and interferometers, among others, can be envisioned.

Of course, numerous modifications could be made to the embodiment described above without departing from the scope of the present invention.

The invention claimed is:

1. A system for permanently writing a diffraction grating, comprising:
   a waveguide made of a low phonon energy glass medium;
   light generating means for generating ultrashort light pulses;

an optical assembly for superposing two beams of said light pulses synchronously in said waveguide and forming therein an interference pattern corresponding to said diffraction grating, said optical assembly focussing said light pulses so that a light intensity in said waveguide exceeds a filamentation threshold; and controlling means for spatially and temporally controlling an exposure of the waveguide to said light pulses in order to limit grating erasing thermal effects induced in the glass medium by said light pulses.

2. The system according to claim 1, wherein the light generating means comprise a light source generating a primary beam, and the optical assembly comprises a phase mask positioned in a path of said primary light beam proximate the waveguide.

3. The system according to claim 2, wherein the optical assembly further comprises a focussing element disposed between the light source and the phase mask, said focussing element focussing the light pulses on said waveguide.

4. The system according to claim 3, wherein the controlling means comprise a scanning assembly for scanning one of the focussing element and waveguide with respect to the other and transversally to the path of the light pulses.

5. The system according to claim 2, wherein said phase mask has a pitch selected to favour a fundamental Bragg resonance of said diffraction grating.

6. The system according to claim 1, wherein the controlling means comprise a modulating element disposed in a path of said light pulses, said modulating element temporally modulating said light pulses to form at least one burst of said light pulses.

7. The system according to claim 1, wherein the controlling means comprise an interrupting mechanism for interrupting said exposure of the waveguide to the light pulses.

8. The system according to claim 7, wherein the controlling means further comprise a monitoring assembly for monitoring optical properties of the waveguide, said monitoring assembly being in communication with said interrupting mechanism to activate the same according to said optical properties.

9. The system according to claim 1, wherein the controlling means comprise a waveguide holder holding said waveguide in a fixed position.

10. The system according to claim 9, wherein said waveguide holder applies a tension on said waveguide.

11. A system for permanently writing a diffraction grating in a waveguide made of a low phonon energy glass medium, said system comprising:
light source for generating a primary beam of ultrashort light pulses;
an optical assembly comprising:
a phase mask positioned in a path of said primary light beam proximate the waveguide for superposing two beams of said light pulses synchronously in said waveguide and forming therein an interference pattern corresponding to said diffraction grating; and
a focussing element disposed between the light source and the phase mask, said focussing element focussing the light pulses on said waveguide so that a light intensity in said waveguide exceeds a value such that a critical plasma density for permanent modification of said glass medium is reached; and
controlling means for spatially and temporally controlling an exposure of the waveguide to said light pulses in order to limit grating erasing thermal effects induced in the glass medium by said light pulses; said controlling means comprising:

a scanning assembly for scanning one of the focussing element and waveguide with respect to the other and transversally to the path of the light pulses;
a modulating element disposed in a path of said light pulses, said modulating element temporally modulating said light pulses to form at least one burst of said light pulses;
an interrupting mechanism for interrupting said exposure of the waveguide to the light pulses; and
a monitoring assembly for monitoring optical properties of the waveguide, said monitoring assembly being in communication with said interrupting mechanism to activate the same according to said optical properties.

12. The system according to claim 11, wherein the controlling means comprise a waveguide holder holding said waveguide in a fixed position, said waveguide holder applying a tension on said waveguide.

13. The system according to claim 11, wherein said value of the light intensity in said waveguide is 10 TW/cm$^2$.

14. A method for permanently writing a diffraction grating in a waveguide made of a low phonon energy glass medium, said method comprising the steps of:
a) generating ultrashort light pulses;
b) superposing two beams of said light pulses synchronously in said waveguide and forming therein an interference pattern corresponding to said diffraction grating;
c) focussing said light pulses so that a light intensity in said waveguide exceeds a filamentation threshold; and
d) spatially and temporally controlling an exposure of the waveguide to said light pulses in order to limit grating erasing thermal effects induced in the glass medium by said light pulses.

15. The method according to claim 14, wherein the generating of step a) comprises generating a primary beam of said light pulses, and the superposing of step b) comprises providing a phase mask in a path of said primary light beam proximate the waveguide.

16. The method according to claim 15, wherein the focussing of step c) comprises providing a focussing element between the light source and the phase mask, said focussing element focussing the light pulses on said waveguide.

17. The method according to claim 16, wherein the controlling of step d) comprises scanning one of the focussing element and waveguide with respect to the other and transversally to the path of the light pulses.

18. The method according to claim 15, wherein said phase mask has a pitch selected to favour a fundamental Bragg resonance of said diffraction grating.

19. The method according to claim 14, wherein the controlling of step d) comprises temporally modulating said light pulses to form at least one burst of said light pulses.

20. The method according to claim 14, wherein the controlling of step d) comprises monitoring optical properties of the waveguide, and interrupting said exposure of the waveguide to the light pulses according to said optical properties.

21. The method according to claim 14, wherein the controlling of step d) comprises holding said waveguide in a fixed position.

22. The method according to claim 14, wherein the controlling of step d) comprises applying a tension on said waveguide.

* * * * *